US012669797B2

(12) United States Patent (10) Patent No.: US 12,669,797 B2

Kubota et al. (45) Date of Patent: Jun. 30, 2026

(54) CONTROL DEVICE, MACHINE TOOL SYSTEM, AND CONTROL METHOD

(71) Applicant: FANUC CORPORATION, Minamitsuru-gun (JP)

(72) Inventors: Riho Kubota, Yamanashi-ken (JP); Kaoru Hiraga, Yamanashi-ken (JP); Hiroyuki Abe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 490 days.

(21) Appl. No.: 18/032,539

(22) PCT Filed: Oct. 18, 2021

(86) PCT No.: PCT/JP2021/038337
§ 371 (c)(1),
(2) Date: Apr. 18, 2023

(87) PCT Pub. No.: WO2022/085604
PCT Pub. Date: Apr. 28, 2022

(65) Prior Publication Data
US 2023/0288905 A1    Sep. 14, 2023

(30) Foreign Application Priority Data
Oct. 22, 2020    (JP) ................................. 2020-177325

(51) Int. Cl.
*G05B 19/00*          (2006.01)
*G05B 19/409*        (2006.01)

(52) U.S. Cl.
CPC .. *G05B 19/409* (2013.01); *G05B 2219/32074* (2013.01); *G05B 2219/45221* (2013.01)

(58) Field of Classification Search
CPC ........ G05B 19/409; G05B 2219/32074; G05B 2219/45221; G05B 2219/23335;
(Continued)

(56) References Cited

U.S. PATENT DOCUMENTS

2006/0019015 A1    1/2006  Faks
2015/0142165 A1    5/2015  Kao et al.
(Continued)

FOREIGN PATENT DOCUMENTS

CN        101316413 A        12/2008
CN        103543684 A        1/2014
(Continued)

OTHER PUBLICATIONS

Office Action issued May 23, 2025 in Chinese Patent Application No. 202180070637.6.
(Continued)

*Primary Examiner* — Aleksey Olshannikov
(74) *Attorney, Agent, or Firm* — Sughrue Mion, PLLC

(57)                ABSTRACT

A control device, includes: a modification instruction receiving unit for receiving modification instructions for a control parameter and for machining program; a history storage unit for causing a storage unit to store a modification history for the control parameter and the machining program; an Undo/Redo processing unit for performing an Undo/Redo process based on the modification history; a determination unit for determining whether a prescribed condition has been met; and a history deletion control unit for deleting the change history stored in the storage unit when the determination unit has determined that the prescribed condition has been met.

15 Claims, 7 Drawing Sheets

(58) Field of Classification Search
CPC ...... G05B 19/4083; G05B 2219/24055; G05B
2219/36043; G05B 2219/36162; B23H
7/02; B23H 7/20; B23H 7/06
See application file for complete search history.

(56) References Cited

U.S. PATENT DOCUMENTS

| | | | | | |
|---|---|---|---|---|---|
| 2020/0117167 | A1* | 4/2020 | Cui | ........................ | G05B 19/18 |
| 2021/0229283 | A1* | 7/2021 | Kobayashi | .............. | B25J 9/163 |
| 2023/0088537 | A1* | 3/2023 | Harris | .................... | G06F 30/17 |
| | | | | | 700/98 |
| 2023/0102750 | A1* | 3/2023 | Parietti | ........... | G05B 19/41865 |
| | | | | | 700/100 |
| 2023/0124935 | A1* | 4/2023 | Takeshita | .............. | G06Q 50/04 |
| | | | | | 700/95 |

FOREIGN PATENT DOCUMENTS

| | | | |
|---|---|---|---|
| CN | 103677486 | A | 3/2014 |
| CN | 106254700 | A | 12/2016 |
| CN | 110125726 | A | 8/2019 |
| CN | 110320857 | A | 10/2019 |
| CN | 111796556 | A | 10/2020 |
| EP | 2 853 966 | A1 | 4/2015 |
| JP | 2000-259564 | A | 9/2000 |
| JP | 2006-048385 | A | 2/2006 |
| JP | 2009-265943 | A | 11/2009 |
| JP | 2018-163541 | A | 10/2018 |
| JP | 2020-061017 | A | 4/2020 |
| TW | 1501060 | B | 9/2015 |

OTHER PUBLICATIONS

International Search Report (ISR) (PCT Form PCT/ISA/210), in PCT/JP2021/038337, dated Dec. 21, 2021.
Communication issued Feb. 7, 2025 in Taiwanese Application No. 110138981.
Blasquez et al., "Undo facilities for the extended z-buffer in NC machining simulation", Computers in Industry, vol. 53, Feb. 1, 2004, pp. 193-204.
Chinese Office Action and Search Report dated Sep. 12, 2025, issued in Chinese application No. 202180070637.6.

* cited by examiner

FIG. 1     <u>10</u>
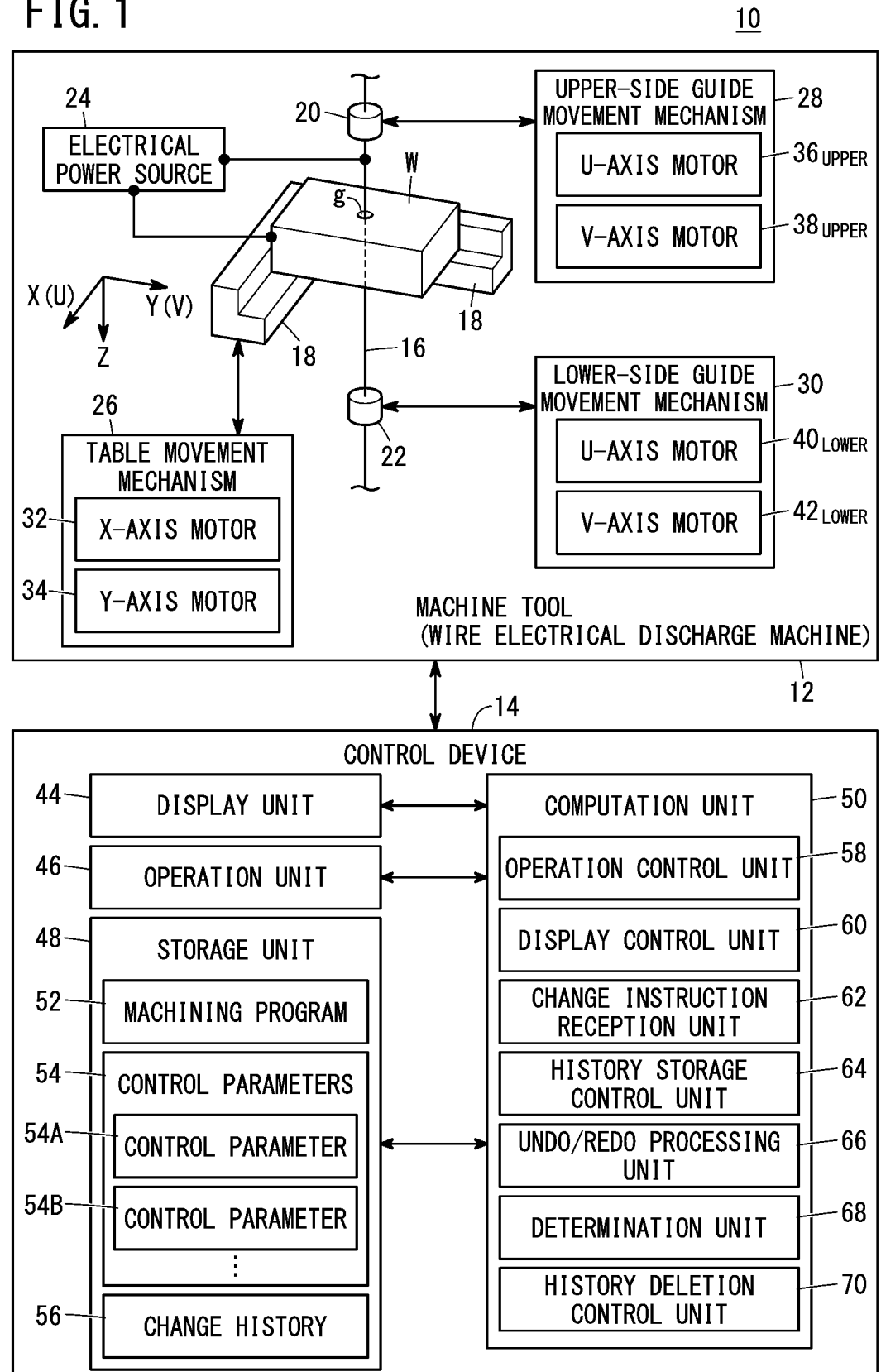

$74_{UNDO}(74)$     $74_{REDO}(74)$     72A (72)

XXXX XXXX XXXX

| PAUSING TIME PERIOD | FEEDING SPEED | XXXX |
|---|---|---|
| XXXXXX | XXXXXX | XXXXXX |

| XXXX | | XXXX |
|---|---|---|
| XXXXXX | | XXXXXX |

$74_{UNDO}(74)$     $74_{REDO}(74)$     72B (72)

XXXX XXXX XXXX

```
O0100
```
```
G00 G40 G50 ;
M21 P5 ;
M88 ;
G10 P0 X1 Y1 Z4 U3 V260 W20 I10 J10 K1 A30
 C10 E7 Q0 L110 (SKD11/ 10/.10/C2) ;
G11 P0 X1 I0 J30003 K0 A0 ;
G10 P10 X1 Y1 Z4 U3 V260 W20 I10 J10 K1 A30 ;
 C10 E7 Q0 L110 (SKD11/ 10/.10/C2) ;
 ⋮
```

CONTROL DEVICE, MACHINE TOOL SYSTEM, AND CONTROL METHOD

TECHNICAL FIELD

The present invention relates to a control device configured to control a machine tool, a machine tool system including the control device, and a control method for controlling the machine tool.

BACKGROUND ART

In JP 2020-061017 A, a control system for a machine tool which performs machining on the basis of control parameters and a machining program is disclosed. Further, in JP 2020-061017 A, it is disclosed that the control parameters are capable of being changed. Furthermore, in JP 2020-061017 A, it is disclosed that it is possible to perform an Undo/Redo process of the changed control parameters.

SUMMARY OF THE INVENTION

The machine tool carries out machining on the basis of the control parameters and the machining program. The control parameters and the machining program are stored in a control device for controlling the machine tool. In this case, the machine tool is capable of executing machining by way of an automatic operation. In this instance, for example, during a setup process prior to initiating the automatic operation, or after the automatic operation has been initiated, concerning the control parameters and the machining program, there may be a case in which the Undo/Redo process that is not intended by the operator is executed accidentally. In this case, during the automatic operation, the machine tool performs an operation that is unintended by the operator.

Thus, the present invention has the object of providing a control device, a machine tool system, and a control method which are capable of preventing execution of an Undo/Redo process that is not intended by the operator.

A first aspect of the present invention is characterized by a control device that controls, based on a control parameter and a machining program, a machine tool configured to machine a workpiece, to thereby cause the machine tool to carry out an automatic operation, the control device including a change instruction reception unit configured to receive a change instruction made by an operator to change the control parameter and the machining program, a history storage control unit configured to cause a change history of the control parameter and the machining program to be stored in a storage unit by cumulatively storing the change instruction made by the operator in the storage unit, an Undo/Redo processing unit configured to perform an Undo/Redo process based on the change history, in accordance with an instruction made by the operator, a determination unit configured to determine whether or not a predetermined condition for preventing the machine tool from operating in a manner unintended by the operator in accordance with execution of the Undo/Redo process has been satisfied, and a history deletion control unit configured to delete the change history stored in the storage unit, in a case that the determination unit has determined that the predetermined condition has been satisfied.

A second aspect of the present invention is characterized by a control device that controls, based on a control parameter and a machining program, a machine tool configured to machine a workpiece, to thereby cause the machine tool to carry out an automatic operation, the control device including a change instruction reception unit configured to receive a change instruction made by an operator to change the control parameter and the machining program, a history storage control unit configured to cause a change history of the control parameter and the machining program to be stored in a storage unit by cumulatively storing the change instruction made by the operator in the storage unit, an Undo/Redo processing unit configured to perform an Undo/Redo process based on the change history, in accordance with an instruction made by the operator, and an Undo/Redo prohibition unit configured to prohibit the Undo/Redo processing unit from performing the Undo/Redo process from a start until an end of the automatic operation.

A third aspect of the present invention is characterized by a machine tool system, including the control device of the first aspect or the second aspect, and the machine tool configured to carry out the automatic operation by being controlled by the control device.

A fourth aspect of the present invention is characterized by a control method of controlling, based on a control parameter and a machining program, a machine tool configured to machine a workpiece, to thereby cause the machine tool to carry out an automatic operation, the control method including a change instruction reception step of receiving a change instruction made by an operator to change the control parameter and the machining program, a history storage step of causing a change history of the control parameter and the machining program to be stored in a storage unit by cumulatively storing the change instruction made by the operator in the storage unit, in a manner so that an Undo/Redo process of the change instruction is able to be carried out, a determination step of determining whether or not a predetermined condition for preventing the machine tool from operating in a manner unintended by the operator in accordance with execution of the Undo/Redo process has been satisfied, and a history deletion control step of deleting the change history stored in the storage unit, in a case it is determined in the determination step that the predetermined condition has been satisfied.

According to the aspects of the present invention, the control device, the machine tool system, and the control method are provided, which are capable of preventing execution of an Undo/Redo process that is not intended by the operator.

BRIEF DESCRIPTION OF DRAWINGS

FIG. 1 is an overall configuration view of a machine tool system according to a first embodiment;

DETAILED DESCRIPTION OF THE INVENTION

Figures 2A, 2B:
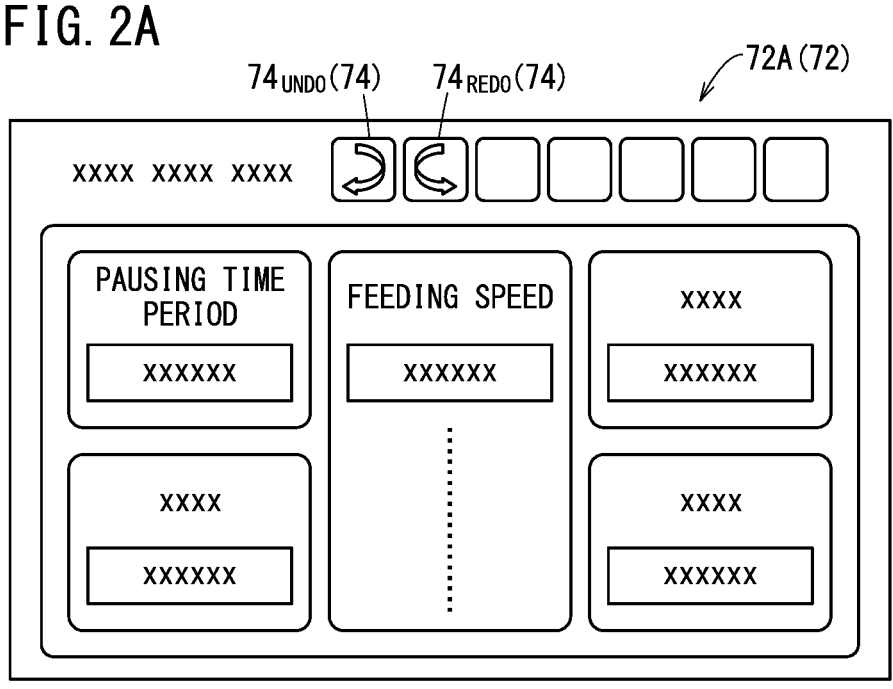
FIG. 2A is a schematic diagram showing a first example of a setting change screen displayed on a display unit according to the first embodiment.
FIG. 2B is a schematic diagram showing a second example of the setting change screen displayed on the display unit according to the first embodiment.

A description will be presented in detail below with reference to the accompanying drawings which set forth suitable embodiments concerning a control device, a machine tool system, and a control method according to the present invention.

First Embodiment

FIG. 1 is an overall configuration view of a machine tool system 10 according to a first embodiment. Among the plurality of axial directions shown in FIG. 1, the X-axis and the Y-axis are axial directions that are parallel to a horizontal plane. The Z-axis is an axial direction that is parallel to the direction of gravity. The X-axis, the Y-axis, and the Z-axis are perpendicular to each other. Further, the U-axis in FIG. 1 is an axial direction lying parallel to the X-axis. The V-axis is an axial direction lying parallel to the Y-axis.

The machine tool system 10 according to the present embodiment is equipped with a machine tool 12 and a control device 14 (refer to FIG. 1). The machine tool 12 according to the present embodiment is a wire electrical discharge machine. Accordingly, hereinafter, the machine tool 12 may also be referred to as a wire electrical discharge machine 12. However, the wire electrical discharge machine 12 is illustrated as an example. Accordingly, the type of the machine tool 12 is not limited to being a wire electrical discharge machine.

The wire electrical discharge machine 12 is the machine tool 12 that carries out electrical discharge machining on a workpiece (an object to be machined) W by using an electric discharge generated in an inter-electrode gap g between a wire electrode 16 and the workpiece W. The wire electrical discharge machine 12 is equipped with a table 18, an upper-side guide 20, a lower-side guide 22, and an electrical power source 24 (refer to FIG. 1).

The table 18 serves as a support platform that supports the workpiece W. The upper-side guide 20 is a wire guide that guides the wire electrode 16 above the table 18 in the Z direction. The lower-side guide 22 is a wire guide that guides the wire electrode 16 below the table 18 in the Z direction. The wire electrode 16 is extended under tension between the upper-side guide 20 and the lower-side guide 22. Consequently, the wire electrode 16 forms the inter-electrode gap g together with the workpiece W.

The wire electrical discharge machine 12 is further equipped with a wire feeding mechanism that causes the wire electrode 16 to travel along the Z direction. However, in the present embodiment, illustration of the wire feeding mechanism is omitted. The wire feeding mechanism includes, for example, a plurality of rollers and motors. In this instance, the wire electrode 16 is wound around each of the rollers. The motors control the rotational torques of the rollers respectively.

The electrical power source 24 is an element for applying a voltage to each of the wire electrode 16 and the workpiece W. For example, the electrical power source 24 includes an electrical circuit that is capable of generating voltage pulses. The aforementioned discharge is generated in the inter-electrode gap g in accordance with the voltage pulses of the electrical power source 24.

The wire electrical discharge machine 12 is further equipped with a table movement mechanism 26, an upper-side guide movement mechanism 28, and a lower-side guide movement mechanism 30.

The table movement mechanism 26 is a mechanism that causes the table 18 to be moved along each of the X direction and the Y direction. The table movement mechanism 26, for example, includes an X-axis motor 32 and a Y-axis motor 34. The X-axis motor 32 is a drive source that causes the table 18 to be moved along the X direction. The Y-axis motor 34 is a drive source that causes the table 18 to be moved along the Y direction. By the table 18 being made to move in a horizontal direction, relative movement in relation to the horizontal direction between the workpiece W on the table 18 and the wire electrode 16 is realized.

The upper-side guide movement mechanism 28 is a mechanism that causes the upper-side guide 20 to be moved along each of the U direction and the V direction. The upper-side guide movement mechanism 28 includes, for example, a U-axis motor $36_{UPPER}$ and a V-axis motor $38_{UPPER}$. The U-axis motor $36_{UPPER}$ is a drive source for causing the upper-side guide 20 to be moved along the U direction. The V-axis motor $38_{UPPER}$ is a drive source for causing the upper-side guide 20 to be moved along the V direction. The lower-side guide movement mechanism 30 is a mechanism that causes the lower-side guide 22 to be moved along each of the U direction and the V direction. The lower-side guide movement mechanism 30 includes, for example, a U-axis motor $40_{LOWER}$ and a V-axis motor $42_{LOWER}$. The U-axis motor $40_{LOWER}$ is a drive source for causing the lower-side guide 22 to be moved along the U direction. The V-axis motor $42_{LOWER}$ is a drive source for causing the lower-side guide 22 to be moved along the V direction. The upper-side guide movement mechanism 28 and the lower-side guide movement mechanism 30 are capable of causing the position of the upper-side guide 20 and the positon of the lower-side guide 22 in the horizontal direction to coincide with each other. In accordance with this feature, the wire electrode 16 becomes parallel with the Z-axis between the upper-side guide 20 and the lower-side guide 22. Further, the upper-side guide movement mechanism 28 and the lower-side guide movement mechanism 30 are also capable of causing the position of the upper-side guide 20 and the position of the lower-side guide 22 in the horizontal direction to differ from each other. In accordance with this feature, the wire electrode 16 becomes inclined with respect to the Z-axis between the upper-side guide 20 and the lower-side guide 22.

The wire electrical discharge machine 12 described above causes an electric discharge to be generated in the inter-electrode gap g while causing the wire electrode 16 to be moved relatively with respect to the workpiece W. Consequently, the wire electrical discharge machine 12 machines the workpiece W into a shape along a path (machining path) of relative movement of the wire electrode 16. Further, the wire electrical discharge machine 12 is capable of easily adjusting the angle of inclination of the wire electrode 16 with respect to the Z-axis, as described above. Accordingly, the wire electrical discharge machine 12 is capable of easily implementing a so-called taper cutting.

The control device 14 is an electronic device which, by controlling the wire electrical discharge machine 12, causes the wire electrical discharge machine 12 to carry out an automatic operation. The control device 14 is equipped with a display unit 44, an operation unit 46, a storage unit 48, and a computation unit 50 (refer to FIG. 1).

The display unit 44 serves to display information. The display unit 44 includes, for example, a liquid crystal or an organic EL (OEL: Organic Electro-Luminescence) monitor.

The operation unit 46 receives information that is input by the operator of the machine tool system 10. The operation unit 46 includes, for example, a keyboard, a mouse, and a touch panel. The touch panel is installed, for example, on the monitor of the display unit 44.

The storage unit 48 serves to store information. The storage unit 48 includes a memory. In this instance, the memory contains, for example, a RAM (Random Access Memory) and a ROM (Read Only Memory). The storage unit 48 of the present embodiment stores a machining program 52, control parameters 54, and a change history 56. The change history 56 is a history of changes made to the machining program 52 and the control parameters 54.

The machining program 52 is a predetermined program that defines the aforementioned machining path. The operator is capable of changing (editing) the machining program 52 via the operation unit 46. The changed contents of the machining program 52 are cumulatively stored in the storage unit 48 as part of the change history 56 by a history storage control unit 64. Moreover, it should be noted that the history storage control unit 64 will be described later.

From among the information necessary for controlling the wire electrical discharge machine 12, the control parameters 54 refer to general information, other than the machining path, that can be specified by the operator. The storage unit 48 is capable of storing a plurality of types of the control parameters 54 (54A, 54B, . . . ) (refer to FIG. 1). The types of the control parameters 54 include, for example, a pulse interval (pausing time period) of the voltage pulses, and a relative movement speed (feeding speed) of the wire electrode 16 with respect to the workpiece W. However, the control parameters 54 are not limited to being the pausing time period and the feeding speed. For example, the control parameters 54 may include information regarding a diameter (wire diameter) or a material of the wire electrode 16. Further, the control parameters 54 may include information regarding a material or a plate thickness of the workpiece W. The operator is capable of changing the control parameters 54 via the operation unit 46. The changed contents of the control parameters 54 are cumulatively stored in the storage unit 48 as part of the change history 56 by the history storage control unit 64.

The computation unit 50 performs a computation process on the information. The computation unit 50 includes a processor. In this instance, the processor includes, for example, a CPU (Central Processing Unit) and a GPU (Graphics Processing Unit). The computation unit 50 comprises an operation control unit 58, a display control unit 60, a change instruction reception unit 62, a history storage control unit 64, an Undo/Redo processing unit 66, a determination unit 68, and a history deletion control unit 70 (refer to FIG. 1). The operation control unit 58, the display control unit 60, the change instruction reception unit 62, the history storage control unit 64, the Undo/Redo processing unit 66, the determination unit 68, and the history deletion control unit 70 are virtually realized by the computation unit 50 executing a predetermined control program. In this instance, the predetermined control program is stored beforehand in the storage unit 48 in a manner so that the computation unit 50 is capable of reading the control program (not shown).

The operation control unit 58 causes the wire electrical discharge machine 12 to perform the automatic operation, by controlling the wire electrical discharge machine 12 on the basis of the machining program 52 and the control parameters 54. For example, in the case that an instruction is issued by the operator via the operation unit 46 to initiate the automatic operation, the operation control unit 58 refers to the machining program 52 and the control parameters 54 that are stored in the storage unit 48. The operation control unit 58 initiates the automatic operation of the wire electrical discharge machine 12 on the basis of the referenced machining program 52 and control parameters 54. In such an automatic operation, the operation control unit 58 automatically controls the pausing time period, for example, based on the control parameters 54 related to the electrical power source 24. Further, the operation control unit 58 automatically controls the relative movement of the wire electrode 16 (the table movement mechanism 26) based on the machining program 52.

The display control unit 60 causes the display unit (monitor) 44 to display setting change screens 72 (refer to FIGS. 2A and 2B). The setting change screens 72 are screens in order for the operator to change at least one of the machining program 52 or the control parameters 54. The change instruction reception unit 62 also receives a change instruction to change the machining program 52 and the control parameters 54, based on an operation of the operation unit 46 made by the operator. In accordance with this feature, while observing the setting change screens 72, the operator is capable of transmitting the change instruction to the change instruction reception unit 62. Based on the change instruction made by the operator, the change instruction reception unit 62 changes (updates) the machining program 52 and the control parameters 54.

FIG. 2A is a schematic diagram showing a first example of the setting change screens 72 displayed on the display unit 44 according to the first embodiment. FIG. 2B is a schematic diagram showing a second example of the setting change screens 72 displayed on the display unit 44 according to the first embodiment.

The setting change screens 72 include, for example, a setting change screen 72A (refer to FIG. 2A) and a setting change screen 72B (refer to FIG. 2B). It should be noted that the user interface of the setting change screen 72A is not limited to the example illustrated in FIG. 2A. Further, the user interface of the setting change screen 72B is not limited to the example illustrated in FIG. 2B.

The setting change screen 72A is displayed on the display unit 44 in the case that the operator changes the control parameters 54. In this instance, the display control unit 60 causes the display unit 44 to display the setting change screen 72A. A plurality of items for designating the control parameters 54 are displayed on the setting change screen 72A. In this instance, the plurality of items include, for example, an item for specifying the pausing time period, and an item for specifying the feeding speed. While observing the setting change screen 72A, the operator is capable of specifying the control parameters 54 corresponding to each of the items via the operation unit 46. Designation of the control parameters 54 in this context includes an operation of changing the control parameters 54 that have already been designated by the operator.

The setting change screen 72B is displayed on the display unit 44 in the case that the operator changes (edits) the machining program 52. In this instance, the display control unit 60 causes the display unit 44 to display the setting change screen 72B. The contents of the machining program 52 are displayed on the setting change screen 72B. More specifically, the setting change screen 72B displays codes representing the machining path. While observing the setting change screen 72B, the operator is capable of performing an operation to change (edit) the machining program 52 via the operation unit 46.

The setting change screens 72 (72A and 72B) each include two icons 74 (74$_{UNDO}$ and 74$_{REDO}$). The two icons 74 are displayed in common on both the setting change screen 72A and the setting change screen 72B. The icon 74$_{UNDO}$ is an icon 74 in order for the operator to issue an Undo process instruction. The operator can issue an instruction to the control device 14 to execute the Undo process by clicking on the icon 74$_{UNDO}$ with a mouse, or alternatively, by touching the touch panel. Further, the icon 74$_{REDO}$ is an icon 74 in order for the operator to issue a Redo process instruction. The operator can issue an instruction to the control device 14 to execute the Redo process by clicking on the icon 74$_{REDO}$ with a mouse, or alternatively, by touching the touch panel.

In this instance, a description is given concerning the Undo/Redo process. However, since the Undo/Redo process is already known, the operation will be briefly explained. The "Undo/Redo" process refers to a process that includes two types of processing, including the "Undo" process and the "Redo" process. The Undo process is a process for canceling the change instruction. When the Undo process is executed, the machining program 52 or the control parameters 54 are returned to the state prior to the change instruction having been issued. When the Undo process is executed consecutively, the change instruction to change the machining program 52 or the control parameters 54 is canceled for the number of times that the Undo process was carried out. On the other hand, the Redo process is a process of canceling the aforementioned Undo process. When the Redo process is executed after the Undo process has been executed, the machining program 52 or the control parameters 54 are returned to the state prior to the Undo process having been executed. Further, when the Redo process is executed consecutively, the execution of the Undo process is canceled for the number of times that the execution was carried out.

In order for the control device 14 to execute the Undo/Redo process, a cumulative record of the past change instructions made by the operator is required. According to the present embodiment, the history storage control unit 64 causes the change history 56 to be stored in the storage unit 48. More specifically, by cumulatively causing the change instructions made by the operator to be stored in the storage unit 48, the history storage control unit 64 causes the change history 56 of the changes made to the control parameters 54 and the machining program 52 to be stored in the storage unit 48.

The Undo/Redo processing unit 66 performs an Undo/Redo process in the present embodiment. The Undo/Redo processing unit 66 executes the Undo process when the operator presses the icon 74$_{UNDO}$. In this instance, the Undo/Redo processing unit 66 refers to the change history 56 as necessary. Further, the Undo/Redo processing unit 66 executes the Redo process when the operator presses the icon 74$_{REDO}$. In this instance as well, the Undo/Redo processing unit 66 refers to the change history 56 as necessary.

The determination unit 68 determines whether or not a predetermined condition has been satisfied. In this instance, the predetermined condition is a condition determined in order to prevent the wire electrical discharge machine 12 from operating in a manner unintended by the operator due to execution of the Undo/Redo process. In the case that the determination unit 68 has determined that the predetermined condition has been satisfied, the history deletion control unit 70 deletes the change history 56 that was stored in the storage unit 48.

The predetermined condition designates a start timing of the period during which the execution of the Undo/Redo process is prohibited. The change history 56 is deleted when the predetermined condition has been satisfied. Accordingly, the Undo/Redo processing unit 66 is not capable of referring to the change history 56 after the predetermined condition has been satisfied. Therefore, execution of the Undo/Redo process by the Undo/Redo processing unit 66 is substantially prohibited after the predetermined condition has been satisfied. As a result, after the predetermined condition has been satisfied, an execution of the Undo/Redo process that is not intended by the operator is prevented. Accordingly, any concern that the wire electrical discharge machine 12 may operate in a manner that is unintended by the operator is reduced.

Hereinafter, a specific example of the predetermined condition will be described. If the Undo/Redo process is executed during a period from the initiation of machining by the automatic operation until after the machining is completed, the wire electrical discharge machine 12 may operate in a manner that is unintended by the operator. Taking this into consideration, the predetermined condition, for example, is "the initiation of the automatic operation of the wire electrical discharge machine 12". In this case, the determination unit 68 determines that the predetermined condition has been satisfied in the case that the wire electrical discharge machine 12 has initiated the automatic operation. Further, in the case that the wire electrical discharge machine 12 has initiated the automatic operation, the history deletion control unit 70 deletes the change history 56 that is stored in the storage unit 48. Consequently, execution of the Undo/Redo process during the automatic operation is substantially prohibited.

Figure 3:
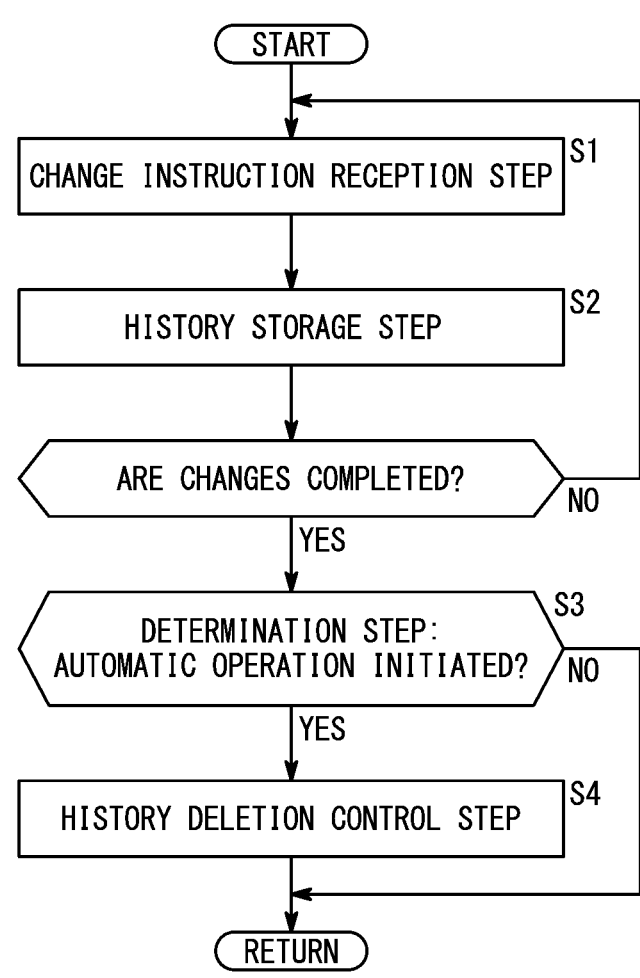
FIG. 3 is a flowchart illustrating a process flow of a control method according to the first embodiment.

FIG. 3 is a flowchart illustrating a process flow of the control method according to the first embodiment.

Hereinafter, a description will be given concerning the control method shown in FIG. 3. The control device 14 is capable of executing the control method shown in FIG. 3. The control method shown in FIG. 3 includes a change instruction reception step S1, a history storage step S2, a determination step S3, and a history deletion control step S4.

The change instruction reception step S1 and the history storage step S2 are included in a preparatory process (a so-called "setup" process) performed by the operator. The setup process is performed prior to the wire electrical discharge machine 12 initiating the automatic operation. In the change instruction reception step S1, the change instruction reception unit 62 receives an instruction by the operator to change the control parameters 54 and the machining program 52. In this instance, in the case that the history storage step S2 has already been performed one time or more (to be described later), the change history 56 has already been stored in the storage unit 48. In this case, the operator may issue an instruction to the Undo/Redo processing unit 66 to execute the Undo/Redo process as necessary.

In the history storage step S2, the history storage control unit 64 causes the change history 56 to be stored in the storage unit 48. In accordance with this feature, the Undo/Redo processing unit 66 is capable of performing the Undo/Redo process in accordance with the instruction made by the operator.

The change instruction reception step S1 and the history storage step S2 may be carried out repeatedly until the setting operation of the control parameters 54 and the machining program 52 is completed ("Are Changes Completed?": YES in FIG. 3) (refer to FIG. 3).

In the determination step S3, the determination unit 68 determines whether or not the wire electrical discharge machine 12 has initiated the automatic operation (whether or not the predetermined condition has been satisfied). In this instance, in the case it is determined that the automatic operation has been initiated (step S3: YES), the history deletion control step S4 is executed. On the other hand, in the case it is determined that the automatic operation has not been initiated (step S3: NO), the control method of the present embodiment is immediately terminated (RETURN).

In the history deletion control step S4, the history deletion control unit 70 deletes the change history 56 that is stored in the storage unit 48. In accordance with this feature, at a time after the history deletion control step S4, execution of the Undo/Redo process in a manner unintended by the operator is prevented. As noted previously, according to the present embodiment, the history deletion control step S4 is executed at the time when the automatic operation is initiated.

As noted previously, according to the present embodiment, by suppressing the execution of the Undo/Redo process that is not intended by the operator, the control device 14 reduces the occurrence in which the machine tool 12, which is currently performing the automatic operation, is operated in a manner unintended by the operator. Further, the machine tool system 10 that includes such a control device 14 is provided. Further, the control method that is executed by the control device 14 is provided.

Exemplary Modifications

The first embodiment has been described above as one example of the present invention. Various modifications or improvements are capable of being added to the first embodiment. Further, it is clear from the scope of the claims that other modes to which such modifications or improvements have been added can be included within the technical scope of the present invention.

Hereinafter, a description will be given the concerning exemplary modifications of the first embodiment. However, explanations that overlap with those of the first embodiment will be omitted insofar as possible in the following description. Unless otherwise specified, reference numerals of constituent components that have already been described in the first embodiment are used from the first embodiment.

Exemplary Modification 1

The predetermined condition is not limited to being the condition that "automatic operation of the machine tool 12 has been initiated" (first embodiment).

For example, after initiation of the machining by the automatic operation, the determination unit 68 may periodically determine whether or not the machining has been completed. In this case, when it is determined that the machining by the automatic operation has not been completed, the determination unit 68 may determine that the predetermined condition has been satisfied. In this case, each time it is determined that the predetermined condition has been satisfied, the history deletion control unit 70 deletes the change history 56. That is, at a time during execution of the machining by the automatic operation, the history deletion control unit 70 periodically deletes the change history 56. A designer or the operator of the machine tool system 10 may examine and decide in advance the time period interval at which the determination unit 68 performs the determination.

According to the present exemplary modification, during the automatic operation, while allowing the change instruction intended by the operator, the Undo/Redo process unintended by the operator is prevented from being executed. In other words, the control device 14 according to the first embodiment prevents the Undo/Redo process from being executed after initiation of the automatic operation. However, for example, at a time after initiation of the automatic operation, a case may occur in which a setting error is noticed by the operator. When such a case is considered, it is preferable to allow the operator to intentionally change the machining program 52 and the control parameters 54 during the automatic operation. However, in such a case, the change history 56 is newly stored in the storage unit 48 based on the change instruction made by the operator after initiation of the automatic operation. Consequently, it is made possible for the control device 14 to execute the Undo/Redo process again. In this instance, the history deletion control unit 70 according to the present exemplary modification periodically deletes the change history 56 in the case that the machine tool system 10 is currently executing the automatic operation. The time period interval during which the deletion process is repeated is preferably as short as possible, in a manner so that the Undo/Redo process is not executed. In accordance with this feature, during the automatic operation, while allowing the change instruction intended by the operator, the control device 14 prevents the Undo/Redo process that is not intended by the operator from being executed.

Moreover, there may be cases in which the machine tool system 10 pauses (temporarily stops) the automatic operation. The machine tool system 10 pauses the automatic operation, for example, due to the following reasons (1) to (4): (1) a case in which the machine tool system 10 executes a program that includes pausing of the automatic operation; (2) a case in which an alarm is issued during machining; (3) a case in which a stop instruction is issued by the operator; and (4) a case in which the wire electrode 16 is disconnected. In a situation where the automatic operation is paused, although the automatic operation control is suspended, a condition occurs in which the machining is not yet completed. Accordingly, except in the case that the operator intentionally issues the change instruction, it is undesirable for the control parameters 54 and the machining program 52 to be changed during the period in which the automatic operation is paused. For the aforementioned reason, it is preferable that the determination unit 68 determines that the predetermined condition is being satisfied, even in the case that the automatic operation is paused. Consequently, the history deletion control unit 70 deletes the change history 56 even during the period in which the automatic operation is being paused. As a result, execution of the Undo/Redo process not intended by the operator is prevented more satisfactorily. The determination as to whether or not the automatic operation is being paused may be performed periodically.

Figure 4:
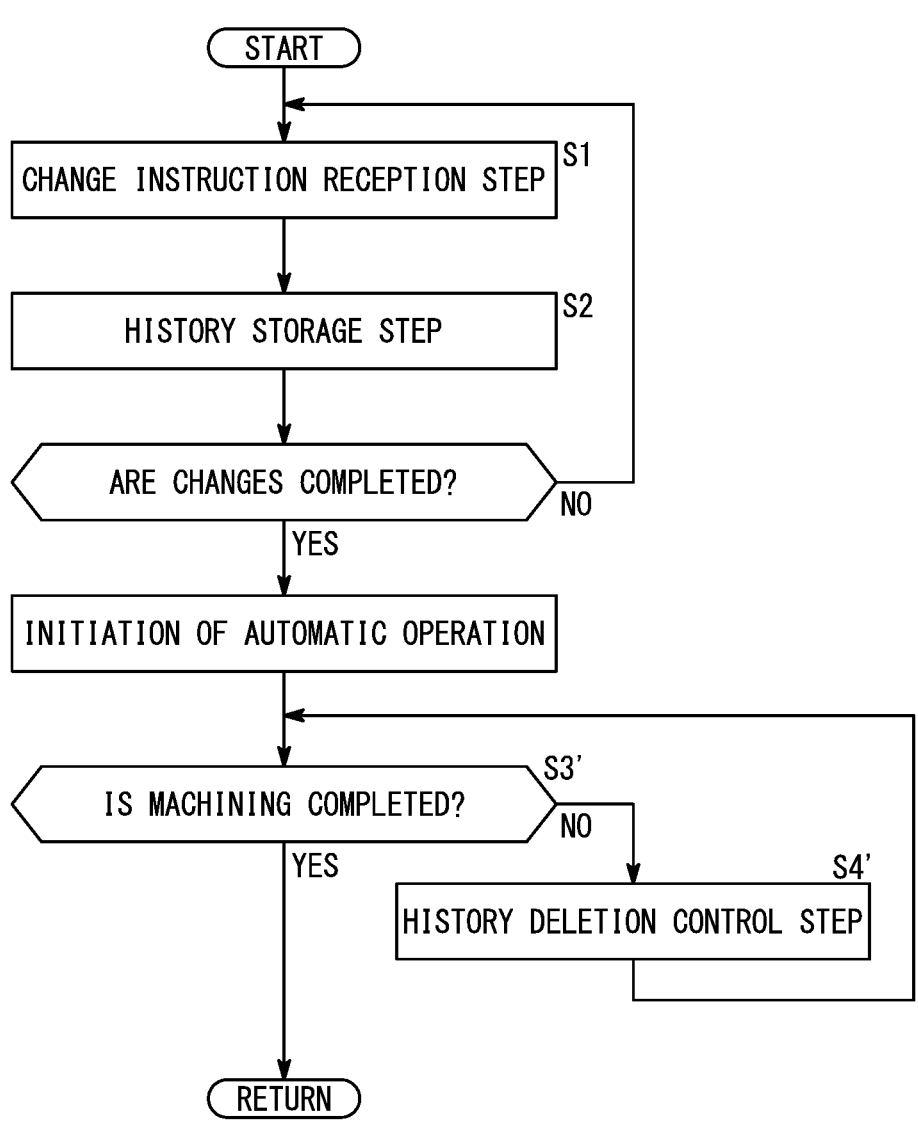
FIG. 4 is a flowchart illustrating a process flow of a first example of the control method according to a first exemplary modification.

FIG. 4 is a flowchart illustrating a process flow of a first example of the control method according to the first exemplary modification.

The determination unit 68 according to the above-described example determines whether or not the machining is completed after the automatic operation has been initiated (step S3' in FIG. 4). In this instance, in the case that the automatic operation is paused, the determination unit 68 preferably determines that the machining has not been completed. In the case it is determined that the machining has not been completed (S3': NO), the history deletion control unit 70 deletes the change history 56 (step S4' in FIG. 4). On the other hand, in the case it is determined that the machining is completed (step S3': YES), the control method comes to an end (RETURN).

Further, as another example of the present exemplary modification, the history storage control unit 64 need not necessarily store the change instruction in the storage unit 48 during the period from when the automatic operation is initiated until after the machining is completed. In accordance with this feature, during the automatic operation, while allowing the change instruction intended by the operator, the Undo/Redo process that is not intended by the operator is prevented from being executed. In other words, as noted previously, it is preferable to allow the operator to intentionally change the machining program 52 and the control parameters 54 during the automatic operation. However, if the change history 56 is stored in the storage unit 48 based on the change instruction made by the operator, execution of the Undo/Redo process cannot be prevented thereafter. Thus, the history storage control unit 64 does not allow the storage unit 48 to store the change history 56 concerning the change instruction issued during a period from when the automatic operation is initiated until after the machining is completed. In accordance with this feature, during the automatic operation, while allowing the change instruction intended by the operator, it is possible for the control device 14 according to the present exemplary modification to prevent the Undo/Redo process unintended by the operator from being executed.

Figure 5:
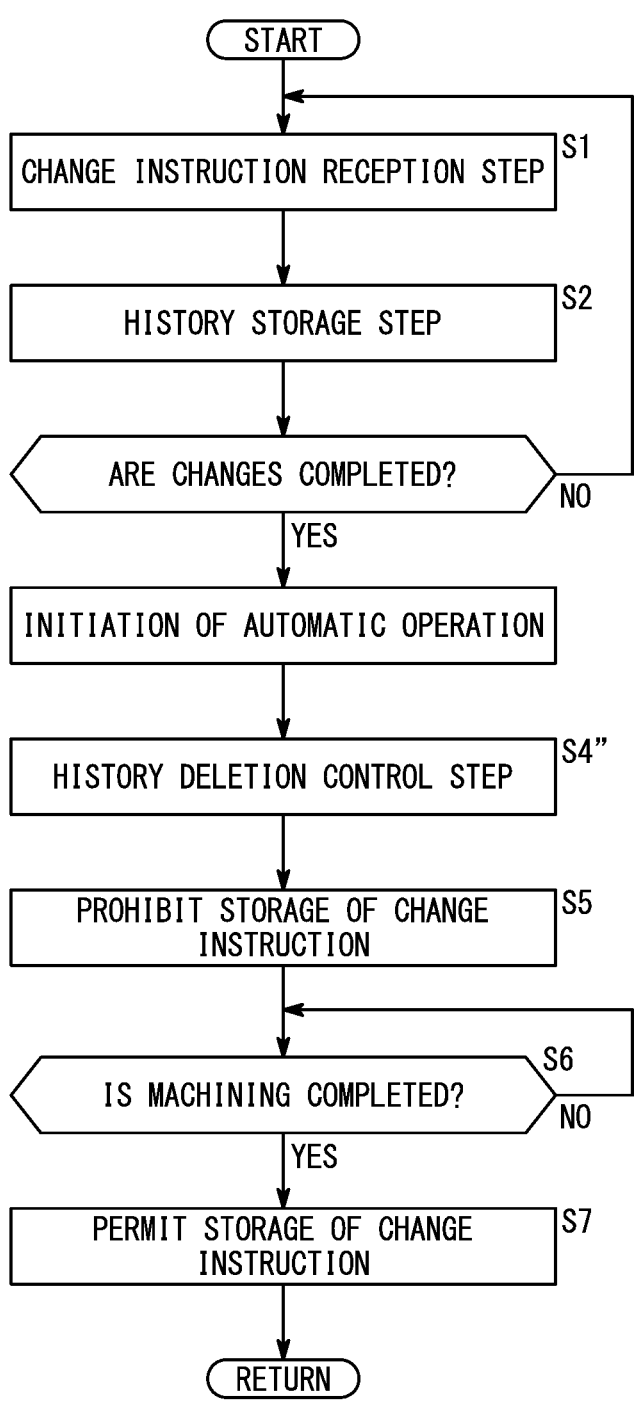
FIG. 5 is a flowchart illustrating a process flow of a second example of the control method according to the first exemplary modification.

FIG. 5 is a flowchart illustrating a process flow of a second example of the control method according to the first exemplary modification.

After having initiated the automatic operation, the history storage control unit 64 according to the above-described example does not cumulatively store the change instructions made by the operator until the machining is completed (step S5 in FIG. 5). The determination unit 68 determines whether or not the machining is completed after the automatic operation has been initiated (step S6 in FIG. 5). In this instance, in the case it is determined that the machining is completed (step S6: YES), storage of the change instruction is permitted (step S7 in FIG. 5). Thereafter, in the case that a change instruction is issued, the history storage control unit 64 updates the change history 56 based on the change instruction. On the other hand, in the case it is determined that the machining has not been completed (step S6: NO), storage of the change instruction is continuously prohibited.

In the example shown in FIG. 5, the timing at which change history 56 is deleted (step S4" in FIG. 5) is at a time when the automatic operation is initiated. Consequently, the Undo/Redo process is prevented from being executed during the automatic operation. Moreover, in the example shown in FIG. 5, the change history 56 may be periodically deleted, similar to the example shown in FIG. 4.

Exemplary Modification 2

The determination unit 68 may determine that the predetermined condition has been satisfied, in the case that the machining by the automatic operation has been completed. In this case, the history deletion control unit 70 deletes the change history 56 in the case that the machining by the automatic operation has been completed.

The machine tool system 10 may carry out the machining for a second time after the machining for the first time has been completed. In this instance, the machining program 52 and the control parameters 54 may differ between the machining for the first time and the machining for the second time. In this case, the operator performs a setup process for the second-time machining after the first-time machining has been completed. However, if the operator carelessly issues an instruction for the Undo/Redo process during the setup process for the second-time machining, there is a possibility that the machining program 52 and the control parameters 54 used in the machining for the first time may be set in the control device 14. In this case, a machining defect may occur during the machining for the second time.

Concerning this point, according to the present exemplary modification, the change history 56 is deleted in the case that the machining by the automatic operation has been completed. Accordingly, in the case that the setting operation to set the machining program 52 and the control parameters 54 is performed by the operator, the machining program 52 and the control parameters 54 which have been used in an immediately prior automatic operation are prevented from being set in the control device 14.

Exemplary Modification 3

The display control unit 60 may cause a plurality of screens to be displayed on the display unit 44 in a manner of enabling a screen transition. In this instance, the plurality of screens include the setting change screens 72. In the case that a screen transition from the setting change screen 72 to another screen has been carried out, the determination unit 68 determines that the predetermined condition has been satisfied. Further, in the case that a screen transition from the setting change screen 72 to another screen has taken place, the history deletion control unit 70 deletes the change history 56.

According to the present exemplary modification, at a time after the screen transition from the setting change screen 72 to another screen has been carried out, execution of the unintended Undo/Redo process based on the change history 56 prior to the transition is prevented. For example, the operator changes the control parameters 54 while observing the setting change screen 72A (refer to FIG. 2A). Thereafter, the display control unit 60 causes the screen to transition from the setting change screen 72A to the setting change screen 72B (refer to FIG. 2B). The control parameters 54 that have been changed by the operator on the setting change screen 72A are not displayed on the setting change screen 72B. In this instance, provisionally, it is assumed that the change history 56 concerning the control parameters 54 remains in the storage unit 48 even after the screen transition to the setting change screen 72B has been completed. In this case, if the operator carelessly issues an instruction for the Undo/Redo process on the setting change screen 72B, the control parameters 54 are changed. Since the control parameters 54 are not displayed on the setting change screen 72B, it becomes difficult for the operator to realize that the operator has unintentionally changed the control parameters 54. Concerning this point, according to the present exemplary modification, the change history 56 is deleted in the case that a screen transition from the setting change screen 72A to the other screen (72B) is performed. Consequently, on the other screen to which the screen transition has been made, the Undo/Redo process of the control parameters 54 that have been changed on the setting change screen 72A is prevented from occurring.

Exemplary Modification 4

The constituent elements of the wire electrical discharge machine (the machine tool) 12 are not limited to those constituent elements described in the first embodiment. For example, the control device 14 may be equipped with a constituent element for automatically controlling the wire feeding mechanism (refer to the first embodiment) based on the control parameters 54.

Exemplary Modification 5

The exemplary modifications described above may be appropriately combined within a range in which no technical inconsistencies occur.

Second Embodiment

Hereinafter, a machine tool system 10' according to a second embodiment will be described. However, explanations that overlap with those of the first embodiment will be omitted insofar as possible in the following description. Unless otherwise specified, reference numerals of constituent components that have already been described in the first embodiment are used from the first embodiment.

Figure 6:
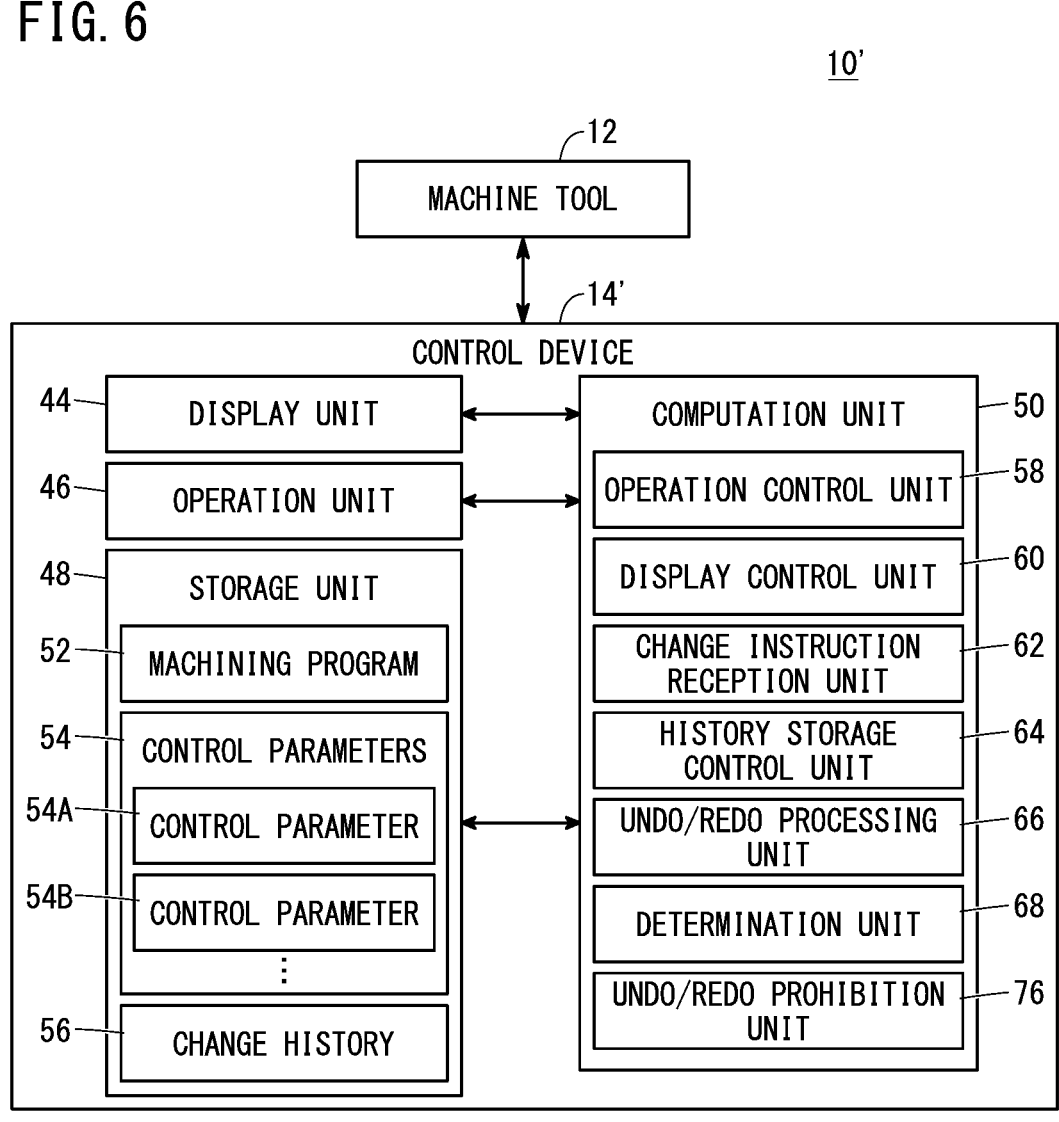
FIG. 6 is a schematic configuration diagram of a machine tool system according to a second embodiment.

FIG. 6 is a schematic configuration diagram of the machine tool system 10' according to the second embodiment.

The machine tool system 10' according to the present embodiment includes the machine tool 12 and a control device 14'. The machine tool 12, for example, is the wire electrical discharge machine.

The control device 14' differs from the control device 14 of the first embodiment (refer to FIG. 1), in that it includes an Undo/Redo prohibition unit 76 instead of the history deletion control unit 70. Accordingly, hereinafter, the Undo/Redo prohibition unit 76 will primarily be described.

In the same manner as the operation control unit 58 etc., the Undo/Redo prohibition unit 76 is virtually realized based on a program. The Undo/Redo prohibition unit 76 prohibits the Undo/Redo process from being carried out during a period from the start until the end of the automatic operation. The Undo/Redo prohibition unit 76 prohibits the Undo/Redo process by issuing an instruction to the Undo/Redo processing unit 66. Incidentally, the determination as to whether or not the current state is within the period from the start to the end of the automatic operation, for example, is carried out by the determination unit 68. Further, the completion of the aforementioned automatic operation does not imply that the automatic operation is paused, but rather that the scheduled machining by the automatic operation is completed.

Figure 7:
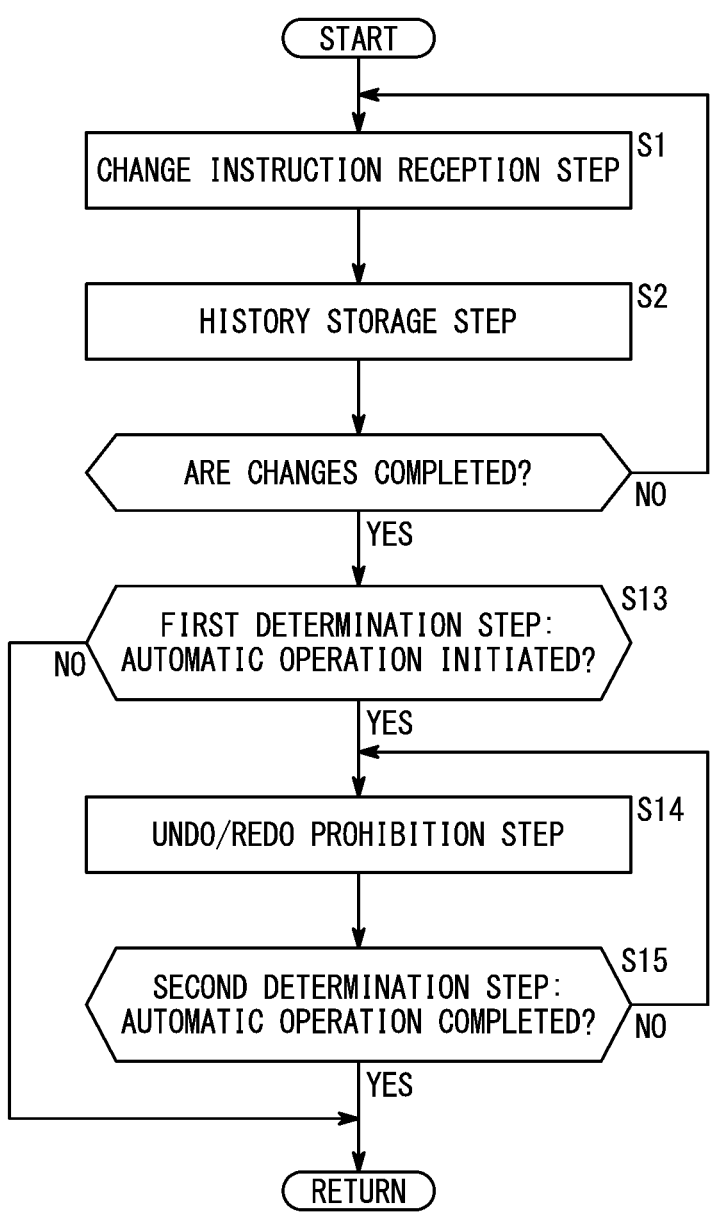
FIG. 7 is a flowchart illustrating a process flow of a control method according to the second embodiment.

FIG. 7 is a flowchart illustrating a process flow of the control method according to the second embodiment.

The control device 14' is capable of executing the control method shown in FIG. 7. The control method shown in FIG. 7 includes the change instruction reception step S1, the history storage step S2, a first determination step S13, an Undo/Redo prohibition step S14, and a second determination step S15. It should be noted that the change instruction reception step S1 and the history storage step S2 have already been described in relation to the first embodiment. Accordingly, description of the change instruction reception step S1 and the history storage step S2 is omitted.

In the first determination step S13, the determination unit 68 determines whether or not the automatic operation has been initiated. In this instance, in the case it is determined that the automatic operation has been initiated (step S13: YES), the Undo/Redo prohibition step S14 is executed. On the other hand, in the case it is determined that the automatic operation has not been initiated (step S13: NO), the control method of the present embodiment is immediately terminated (RETURN).

In the Undo/Redo prohibition step S14, the Undo/Redo prohibition unit 76 prohibits the Undo/Redo processing unit 66 from executing the Undo/Redo process. In the second determination step S15, the determination unit 68 determines whether or not the automatic operation has been completed. In this instance, when it is determined that the automatic operation has been completed (step S15: YES), the control method of the present embodiment comes to an end (RETURN). On the other hand, if it is determined that the automatic operation has not been completed (step S15: NO), the Undo/Redo prohibition step S14 is continued.

According to the present embodiment, without deleting the change history 56, an execution of the Undo/Redo process unintended by the operator is prevented during a period from the start until the end of the automatic operation.

Moreover, it should be noted that the control device 14' may further be equipped with the history deletion control unit 70 (refer to the first embodiment). In such a case, the history deletion control unit 70 deletes the change history 56 from the start until the end of the automatic operation. The period from the start until the end of the automatic operation contains the time point of completion of the automatic operation. The timing at which the predetermined condition is satisfied is not particularly limited, insofar as it is within a period from the start until the end of the automatic operation. More specifically, the timing at which the change history 56 is deleted is not particularly limited, insofar as it is within a period from the start until the end of the automatic operation.

Since the history deletion control unit 70 deletes the change history 56, any concern over erroneously setting the machining program 52 and the control parameters 54 is reduced. In other words, according to the present embodiment, the Undo/Redo prohibition unit 76 prohibits the Undo/Redo process during the automatic operation. However, the change history 56 created before the initiation of the automatic operation is not deleted. In this case, at a time during the setup process for the second-time machining which is performed after the automatic operation for the first time is completed, the machining program 52 and the control parameters 54 may be erroneously set by an Undo/Redo process instruction unintended by the operator. Concerning this point, the history deletion control unit 70 deletes the change history 56 related to the automatic operation for the first time. In accordance with this feature, during the setup process for the second-time machining, any concern over the machining program 52 and the control parameters 54 being erroneously set is reduced.

Further, the exemplary modifications described above in relation to the first embodiment can be appropriately applied to the present embodiment, insofar as the exemplary modifications are within a range in which no Inconsistencies occur.

Inventions that can be Obtained from the Embodiments

The inventions that can be grasped from the above-described embodiments and the modifications thereof will be described below.

<First Invention>

The control device (14) which controls the machine tool (12) that machines the workpiece (W) on the basis of the control parameters (54) and the machining program (52), to thereby cause the machine tool to carry out the automatic operation, includes the change instruction reception unit (62) that receives the change instruction made by the operator to change the control parameters and the machining program, the history storage control unit (64) that causes the change history (56) of the control parameters and the machining program to be stored in the storage unit (48) by cumulatively storing the change instructions made by the operator in the storage unit, the Undo/Redo processing unit (66) that performs the Undo/Redo process based on the change history, in accordance with the instruction made by the operator, the determination unit (68) that determines whether or not the predetermined condition for preventing the machine tool from operating in a manner unintended by the operator in accordance with the execution of the Undo/Redo process has been satisfied, and the history deletion control unit (70) that deletes the change history stored in the storage unit, in the case that the determination unit has determined that the predetermined condition has been satisfied.

In accordance with these features, the control device is provided that prevents the Undo/Redo process unintended by the operator from being executed.

The determination unit may determine that the predetermined condition has been satisfied when the machine tool has initiated the automatic operation.

After initiation of the automatic operation, the determination unit may periodically determine whether or not the machining by the automatic operation has been completed, and each time it is determined that the machining by the automatic operation is not completed, the determination unit may determine that the predetermined condition has been satisfied. In accordance with this feature, during the automatic operation, while allowing the change instruction intended by the operator, it is possible to prevent the Undo/Redo process unintended by the operator from being executed.

The determination unit may determine that the predetermined condition has been satisfied, in the case that the automatic operation is paused. In accordance with this feature, execution of the Undo/Redo process unintended by the operator can be prevented more satisfactorily.

The history storage control unit may not allow the change instruction made by the operator to be stored in the storage unit during the period from when the automatic operation is initiated until after the machining is completed. In accordance with this feature, during the automatic operation, while allowing the change instruction intended by the operator, it is possible to prevent the Undo/Redo process unintended by the operator from being executed.

When the machining by the automatic operation has been completed, the determination unit may determine that the predetermined condition has been satisfied. In accordance with this feature, in the case that the setting operation to set the machining program and the control parameters is performed by the operator, the machining program and the control parameters which have been used in an immediately prior automatic operation are prevented from being set.

The first invention may further be equipped with the display control unit (60) that displays on the display unit (44) the setting change screen (72) in order for the operator to change at least one of the control parameters or the machining program, wherein the determination unit may determine that the predetermined condition has been satisfied when a screen transition from the setting change screen to another screen is performed by the display control unit. In accordance with these features, the control parameters and the machining program that were changed on the setting change screen are prevented from being unintentionally changed after the screen transition from the setting change screen has taken place.

<Second Invention>

The control device (14') which controls the machine tool (12') that machines the workpiece (W) on the basis of the control parameters (54) and the machining program (52), to thereby cause the machine tool to carry out the automatic operation, includes the change instruction reception unit (62) that receives the change instruction made by the operator to change the control parameters and the machining program, the history storage control unit (64) that causes the change history (56) of the control parameters and the machining program to be stored in the storage unit (48) by cumulatively storing the change instructions made by the operator in the storage unit, the Undo/Redo processing unit (66) that performs the Undo/Redo process based on the change history, in accordance with the instruction made by the operator, and the Undo/Redo prohibition unit (76) that prohibits the Undo/Redo processing unit from performing the Undo/Redo process from a start until an end of the automatic operation.

In accordance with these features, the control device is provided that prevents the Undo/Redo process from being executed unintentionally by the operator.

The second invention may further include the determination unit (68) that determines whether or not the predetermined condition for preventing the machine tool from operating in a manner unintended by the operator in accordance with the execution of the Undo/Redo process has been satisfied, and the history deletion control unit (70) that deletes the change history stored in the storage unit, in the case that the determination unit has determined that the predetermined condition has been satisfied. In accordance with these features, in the case that the setting operation to set the machining program and the control parameters is performed by the operator, the machining program and the control parameters which have been used in an immediately prior automatic operation are prevented from being set.

The determination unit according to the second invention may determine that the predetermined condition has been satisfied when the machine tool has initiated the automatic operation.

After initiation of the automatic operation, the determination unit according to the second invention may periodically determine whether or not the machining by the automatic operation has been completed, and each time it is determined that the machining by the automatic operation is not completed, the determination unit may determine that the predetermined condition has been satisfied. In accordance with this feature, during the automatic operation, while allowing the change instruction intended by the operator, it is possible to prevent the Undo/Redo process not intended by the operator from being executed.

The determination unit according to the second invention may determine that the predetermined condition has been satisfied, in the case that the automatic operation is paused. In accordance with this feature, execution of the Undo/Redo process unintended by the operator can be prevented more satisfactorily.

<Third Invention>

The machine tool system (10, 10') includes the control device (14, 14') of the first invention or the second invention, and the machine tool (12) that carries out the automatic operation by being controlled by the control device.

In accordance with these features, the machine tool system is provided that prevents the Undo/Redo process unintended by the operator from being executed.

The machine tool may be a wire electrical discharge machine.

<Fourth Invention>

The control method of controlling the machine tool (12) that machines the workpiece (W) on the basis of the control parameters (54) and the machining program (52), to thereby cause the machine tool to carry out the automatic operation, includes the change instruction reception step (S1) of receiving the change instruction made by the operator to change the control parameters and the machining program, the history storage step (S2) of causing the change history (56) of the control parameters and the machining program to be stored in the storage unit (48) by cumulatively storing the change instructions made by the operator in the storage unit, in a manner so that the Undo/Redo process of the change instruction by the operator can be carried out, the determination step (S3) of determining whether or not the predetermined condition for preventing the machine tool (12) from operating in a manner unintended by the operator in accordance with the execution of the Undo/Redo process has been satisfied, and the history deletion control step (S4) of deleting the change history stored in the storage unit, in the case it is determined in the determination step that the predetermined condition has been satisfied.

In accordance with these features, the control method is provided that prevents the Undo/Redo process unintended by the operator from being executed.

The invention claimed is:

1. A control device that controls, based on a control parameter and a machining program, a machine tool configured to machine a workpiece, to thereby cause the machine tool to carry out an automatic operation, the control device comprising:

one or more processors; and an input device configured to receive information that is input, wherein the one or more processors execute computer-executable instructions stored in a memory to cause the control device to:

receive a change instruction made by an operator to change the control parameter and the machining program, based on input information that is input via the input device;

cause a change history of the control parameter and the machining program to be stored in the memory by automatically and cumulatively storing the change instruction made by the operator in the memory;

perform an Undo/Redo process based on the change history, in accordance with an instruction made by the operator;

determine whether or not a predetermined condition for preventing the machine tool from operating in a manner unintended by the operator in accordance with execution of the Undo/Redo process has been satisfied; and automatically delete the change history stored in the memory, in a case that the predetermined condition has been satisfied.

2. The control device according to claim 1, wherein the one or more processors cause the control device to determine that the predetermined condition has been satisfied when the machine tool has initiated the automatic operation.

3. The control device according to claim 1, wherein the one or more processors cause the control device to periodically determine, after initiation of the automatic operation, whether or not machining by the automatic operation has been completed, and determine, each time it is determined that the machining by the automatic operation is not completed, that the predetermined condition has been satisfied.

4. The control device according to claim 3, wherein the one or more processors cause the control device to determine that the predetermined condition has been satisfied, in a case that the automatic operation is paused.

5. The control device according to claim 1, wherein the one or more processors cause the control device to not allow the change instruction made by the operator to be stored in the memory during a period from when the automatic operation is initiated until after machining is completed.

6. The control device according to claim 1, wherein the one or more processors cause the control device to determine that the predetermined condition has been satisfied when machining by the automatic operation has been completed.

7. The control device according to claim 1, wherein the one or more processors cause the control device to display on a monitor a setting change screen in order for the operator to change at least one of the control parameter or the machining program, and determine that the predetermined condition has been satisfied when a screen transition from the setting change screen to another screen is performed.

8. A control device that controls, based on a control parameter and a machining program, a machine tool configured to machine a workpiece, to thereby cause the machine tool to carry out an automatic operation, the control device comprising:

one or more processors; and an input device configured to receive information that is input, wherein the one or more processors execute computer-executable instructions stored in a memory to cause the control device to:

receive a change instruction made by an operator to change the control parameter and the machining program, based on input information that is input via the input device;

cause a change history of the control parameter and the machining program to be stored in the memory by automatically and cumulatively storing the change instruction made by the operator in the memory;

perform an Undo/Redo process based on the change history, in accordance with an instruction made by the operator; and automatically prohibit the performing the Undo/Redo process from a start until an end of the automatic operation.

9. The control device according to claim 8, wherein the one or more processors cause the control device to determine whether or not a predetermined condition for preventing the machine tool from operating in a manner unintended by the operator in accordance with execution of the Undo/Redo process has been satisfied; and delete the change history stored in the memory, in a case that the predetermined condition has been satisfied.

10. The control device according to claim 9, wherein the one or more processors cause the control device to determine that the predetermined condition has been satisfied when the machine tool has initiated the automatic operation.

11. The control device according to claim 9, wherein the one or more processors cause the control device to periodically determine, after initiation of the automatic operation, whether or not machining by the automatic operation has been completed, and determine, each time it is determined that the machining by the automatic operation is not completed, that the predetermined condition has been satisfied.

12. The control device according to claim 11, wherein the one or more processors cause the control device to determine that the predetermined condition has been satisfied, in a case that the automatic operation is paused.

13. A machine tool system comprising the control device according to claim 1, and the machine tool configured to carry out the automatic operation by being controlled by the control device.

14. The machine tool system according to claim 13, wherein the machine tool is a wire electrical discharge machine.

15. A control method of controlling, based on a control parameter and a machining program, a machine tool configured to machine a workpiece, to thereby cause the machine tool to carry out an automatic operation, the control method comprising:

receiving a change instruction made by an operator to change the control parameter and the machining program, based on input information that is input via an input device configured to receive information that is input;

causing a change history of the control parameter and the machining program to be stored in a memory by automatically and cumulatively storing the change instruction made by the operator in the memory, in a manner so that an Undo/Redo process of the change instruction is able to be carried out;

determining whether or not a predetermined condition for preventing the machine tool from operating in a manner unintended by the operator in accordance with execution of the Undo/Redo process has been satisfied; and automatically deleting the change history stored in the memory, in a case that the predetermined condition has been satisfied.

* * * * *